United States Patent [19]
Luick

[11] Patent Number: 5,276,969
[45] Date of Patent: Jan. 11, 1994

[54] MONOFILAMENT TRIMMER WITH STRING PROTECTOR

[76] Inventor: Woodrow W. Luick, 104 Castlewood, Corpus Christi, Tex. 78410

[21] Appl. No.: 966,352

[22] Filed: Oct. 26, 1992

[51] Int. Cl.$^5$ .................... B26B 27/00; A01D 55/00
[52] U.S. Cl. ........................................ 30/276; 30/347; 56/12.7
[58] Field of Search ............... 30/292, 296, 347, 276; 56/12.7, 335, 294, 295

[56] References Cited

U.S. PATENT DOCUMENTS

| | | | |
|---|---|---|---|
| 4,054,992 | 10/1977 | Ballas et al. | 56/12.7 |
| 4,062,114 | 12/1977 | Luick | 30/276 |
| 4,086,700 | 5/1978 | Inada | 30/347 |
| 4,253,288 | 3/1981 | Sheldon | 30/276 |
| 4,571,831 | 2/1986 | White | 56/12.7 |
| 4,644,655 | 2/1987 | Bottamiller et al. | 30/347 |

*Primary Examiner*—Richard K. Seidel
*Assistant Examiner*—Paul M. Heyrana
*Attorney, Agent, or Firm*—G. Turner Moller

[57] ABSTRACT

A string trimmer provides a cutting head having a passage therethrough receiving a cutting element of fixed length. The cutting element includes a monofilament line and a resilient sleeve surrounds one end of the monofilament line. A rigid eyelet in one end of the resilient sleeve provides an external upset or abutment which cooperates with a shoulder or restriction in the passage to retain the cutting element in the passage during cutting. A groove in the periphery of the cutting head intersects the passage and provides a recess for wholly receiving the cutting element if the user positions the cutting head against an immovable obstacle.

10 Claims, 2 Drawing Sheets

U.S. Patent    Jan. 11, 1994    Sheet 1 of 2    5,276,969
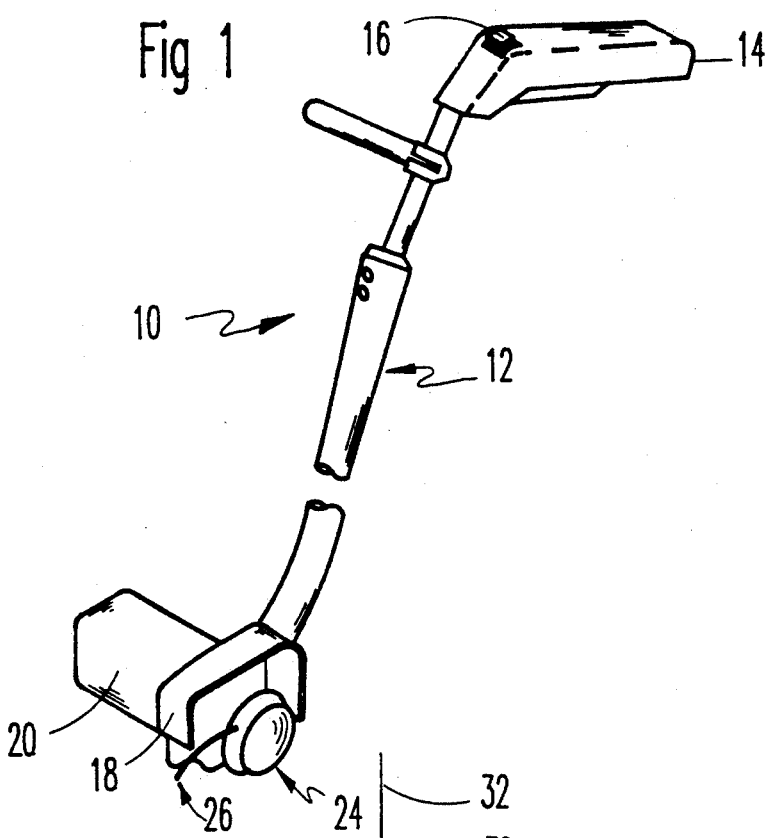
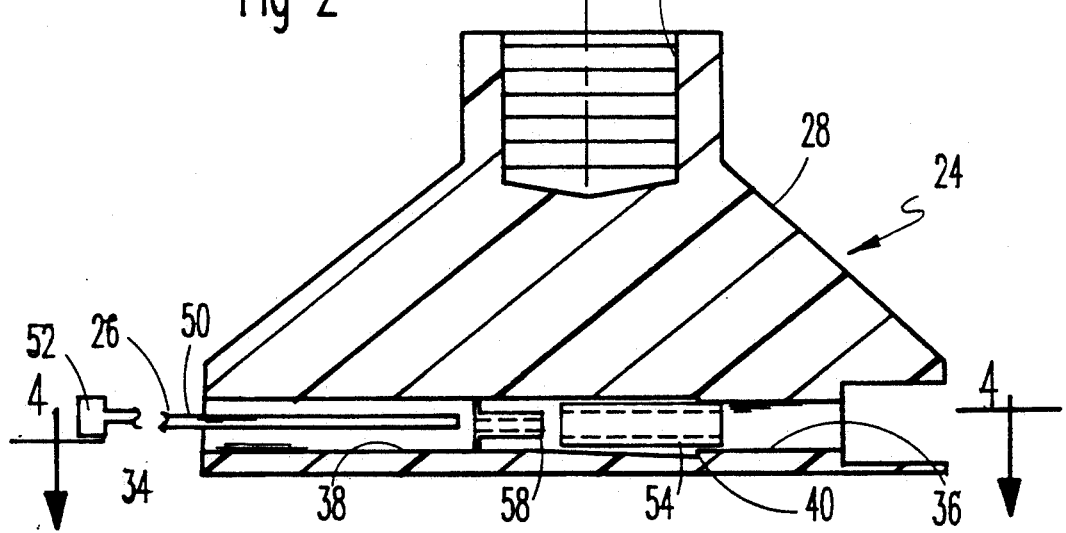

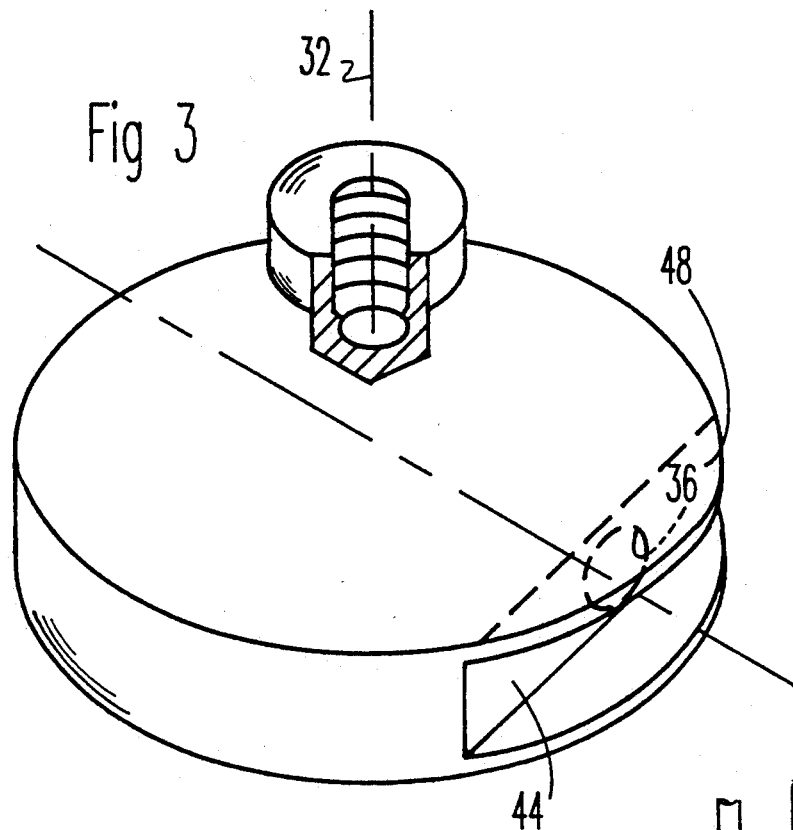
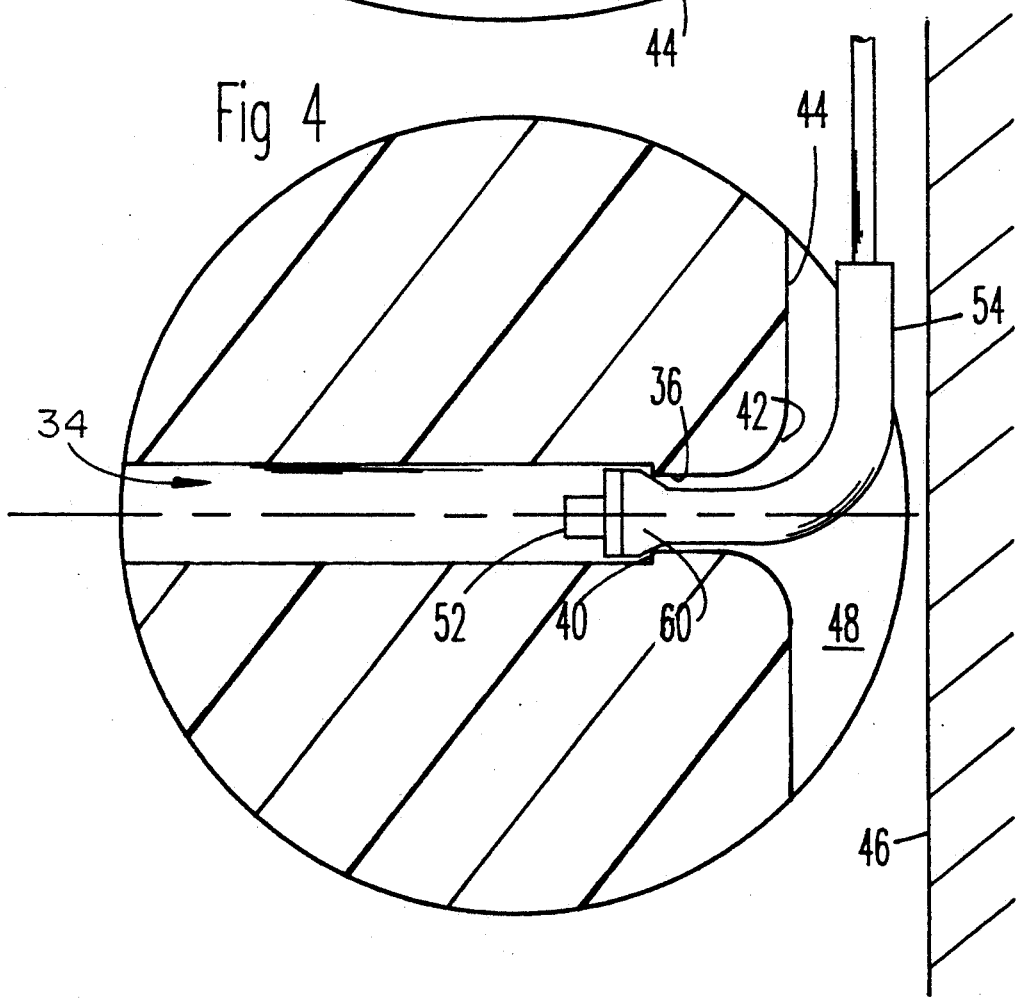

MONOFILAMENT TRIMMER WITH STRING PROTECTOR

This invention relates to a monofilament or string trimmer having means to protect the monofilament line against shearing.

The most common commercially available type string trimmer includes a reel having a long length of monofilament wound onto a spool mounted for intermittent advancing motion to expose a new portion of the monofilament line. Because of problems of winding a new cord onto the spool and with the advancement mechanisms, it has long been proposed to provide string trimmers using a fixed length monofilament element supported in a head attached to the output shaft of an electric or gasoline motor. Typical disclosures of such devices are found in U.S. Pat. Nos. 4,062,114; 4,118,865; 4,295,324 and 4,571,831. It is this type string trimmer to which this invention most nearly relates.

One of the problems with any string trimmer is that the monofilament element is subject to normal wear and tear because of abrasion with the vegetation being cut and subject to abnormal breakage caused by mishandling of the implement. Typically, a novice user wants to cut vegetation with that portion of the monofilament line adjacent the cutting head. This is backwards because the best cutting part of the monofilament line is the free or outboard end due to its much higher velocity. When a novice user runs the cutting head immediately adjacent an immovable object such as a rock, brick wall or fence, the cutting line may be sheared off adjacent the head.

The prior art has made adjustments to avoid this difficulty. In U.S. Pat. No. 4,062,114, a radius is provided for the monofilament line to bend around. In U.S. Pat. No. 4,295,324, a rubber sleeve is provided around the monofilament line and a radius is provided for the monofilament line — rubber sleeve to bend around. Neither of these approaches is completely satisfactory to prevent the monofilament line from being sheared off due to running against an immovable object.

In this invention, the cutting head provides an upper end having a threaded opening for receiving an output shaft of a motor and defining an axis of rotation of the cutting head. A monofilament line receiving passage extends transverse to the axis providing an outlet end on a first side of the head and an inlet end. A groove in the first side of the head extends transverse to and intersects the passage. A monofilament line and a resilient sleeve extends through the passage and extends outwardly through the groove. Means are provided to retain the monofilament line and resilient sleeve in the passage against a centrifugal force induced by rotation of the head. The groove is sufficiently deep to receive the monofilament line and sleeve when the monofilament line and sleeve are bent 90° relative to the passage and the cutting head is placed against a planar abutment tangential to the passage.

In this fashion, the cutting head is configured to wholly receive the monofilament line and resilient sleeve if the user runs the cutting head against a brick wall or other stationary abutment.

It is an object of this invention to provide an improved cutting head for a vegetation cutting device.

Another object of this invention is to provide a cutting head having improved means for protecting the monofilament cutting line against shearing.

These and other objects of this invention will become more fully apparent as this description proceeds, reference being made to the accompanying drawings and appended claims.

IN THE DRAWINGS

FIG. 1 is a pictorial view of a trimmer having thereon a cutting head of this invention;

FIG. 2 is an enlarged cross-sectional view of the cutting element of this invention, illustrating the cutting element in exploded form;

FIG. 3 is an isometric view of the cutting head of this invention illustrating a large notch through which the cutting element extends; and FIG. 4 is an enlarged horizontal cross-sectional view of the cutting head of FIGS. 2-3, illustrating the condition when the cutting head abuts an obstacle.

Referring to FIG. 1, there is illustrated a vegetation cutter or trimmer 10 comprising, as major components, a frame 12 including a handle 14 and control switch 16, a housing or guard arrangement 18 adjustably mounted to be either an edger or a trimmer. A drive mechanism or motor 20 provides an output shaft (not shown) on which is mounted a cutting head 24 and cutting element 26 of this invention.

Referring to FIGS. 2-4, the head 24 comprises a body 28 of any suitable material, such as wood, plastic or metal, providing a threaded opening 30 for receiving the motor shaft and defining an axis of rotation 32. The body 28 may be of any suitable shape and includes a cutting element receiving passage 34 transverse to the axis 32. The passage 34 includes a small diameter section 36 providing an outlet end through which the cutting element 26 extends. A larger diameter section 38 provides an inlet end and a shoulder or restriction 40 adjacent the small diameter section 36 for retaining the cutting element 26 in a cutting position as will be more fully apparent hereinafter.

The passage 36 opens through a radius 42 into a groove 44 in the periphery of the cutting head 24. The groove 42 is of sufficient depth to receive the entire thickness of the cutting element 26 if the head 24 were abutted against a planar obstacle 46 and the cutting element 26 bent 90° relative to the passage 34 as shown in FIG. 4. The groove 44 is generally U-shaped in cross-section and preferably extends perpendicular to the passage 34 on both sides thereof leaving a pair of chord shaped segments 48 of the body 28 to complete the circumference of the head 24.

The cutting element 26 includes a monofilament line 50 having an enlargement 52 on one end threaded into a much shorter length of resilient sleeve 54. The monofilament line 50 is of nylon or the like and, before use, is of a useable fixed length, as contrasted to a spooled length of material. The line 50 and enlargement 52 may be made by injection molding or in a process analogous to the manufacture of a nail where the enlargement 52 is created from the end of the line 50 by heating and shaping.

The resilient sleeve 54 comprises a length of tubing of rubber or other similar resilient material having a rigid eyelet 58 forced into one end thereof creating an upset external end or abutment 60 on the sleeve 54. As will be apparent, the abutment 60 cooperates with the restriction 40 between the large and small diameter sections 36, 38 of the passage 34 to resist centrifugal force and retain the cutting element 26 in the passage 34 during rotation of the cutting head 24.

When using the trimmer 10, it is preferred that the bulk of the cutting effort be done with the outer tip of the monofilament line 50. If a user positions the cutting head 24 too close to an immovable obstacle 46, as shown in FIG. 4, the monofilament line 50 and resilient sleeve 54 can bend over the radius 42 to lie wholly in the groove 44 and is thereby prevented from shearing off.

When the monofilament line 50 wears away to a length that is too short for efficient cutting, the cutting element 26 is removed from the head 24 by simply pushing on the free end of the monofilament line 50. This pushes the resilient sleeve 54 radially outward through the large diameter passage section 38 so the cutting element 26 can be removed. The worn monofilament line 50 is then removed from the resilient sleeve 54 and replaced with a new one of the normal unused length.

Although this invention has been disclosed and described in its preferred forms with a certain degree of particularity, it is understood that the present disclosure of the preferred forms is only by way of example and that numerous changes in the details of construction and operation and in the combination and arrangement of parts may be resorted to without departing from the spirit and scope of the invention as hereinafter claimed.

I claim:

1. Apparatus for cutting vegetation, comprising
    a cutting head having an upper end providing a opening thereinto for receiving an output shaft of a motor and defining an axis of rotation of the cutting head, a monofilament line receiving passage transverse to the axis having an outlet end on a first side of the head and an inlet end, and a groove in the first side of the head transverse to and intersecting the passage;
    a monofilament line and a resilient sleeve surrounding a first end of the monofilament line, the monofilament line and sleeve being in the passage and extending longitudinally through the groove; and
    means retaining the monofilament line and resilient sleeve in the passage against a centrifugal force induced by rotation of the head;
    the groove being sufficiently deep to receive the monofilament line and sleeve when the monofilament line and sleeve are bent 90° relative to the passage and the cutting head is placed against a planar abutment perpendicular to the passage.

2. The apparatus of claim 1 wherein the inlet end of the passage opens through the cutting head on a second side thereof opposite from the first side.

3. The apparatus of claim 1 wherein the retaining means comprises an abutment provided by the monofilament line and resilient sleeve.

4. The apparatus of claim 3 wherein the head further comprises a restriction in the passage, the abutment resting against the restriction.

5. The apparatus of claim 4 wherein the resilient sleeve comprises a rigid eyelet in one end thereof providing the abutment, the monofilament line having an enlargement on one end thereof abutting the rigid eyelet.

6. The apparatus of claim 4 wherein the resilient sleeve provides a uniform internal diameter passage therethrough in a relaxed condition of the sleeve and the eyelet provides a rigid tubular section larger than the internal diameter, the resilient sleeve being sufficiently flexible to receive the tubular section and thereby creating an external upset end providing the abutment.

7. The apparatus of claim 1 wherein the passage intersects an intermediate portion of the groove.

8. The apparatus of claim 1 wherein the resilient sleeve is of a rubber like material.

9. The apparatus of claim 1 wherein the resilient sleeve is of larger internal dimension than the external dimension of the monofilament line.

10. The apparatus of claim 1 wherein the cutting head is generally circular providing an outer edge and the resilient sleeve extends axially along the monofilament line for less than the length of the monofilament line and extends beyond the outer edge of the head.

* * * * *